Sept. 28, 1948.       E. LABIN ET AL       2,450,005
OMNIDIRECTIONAL RADIO BEACON
Filed April 26, 1944       4 Sheets-Sheet 1
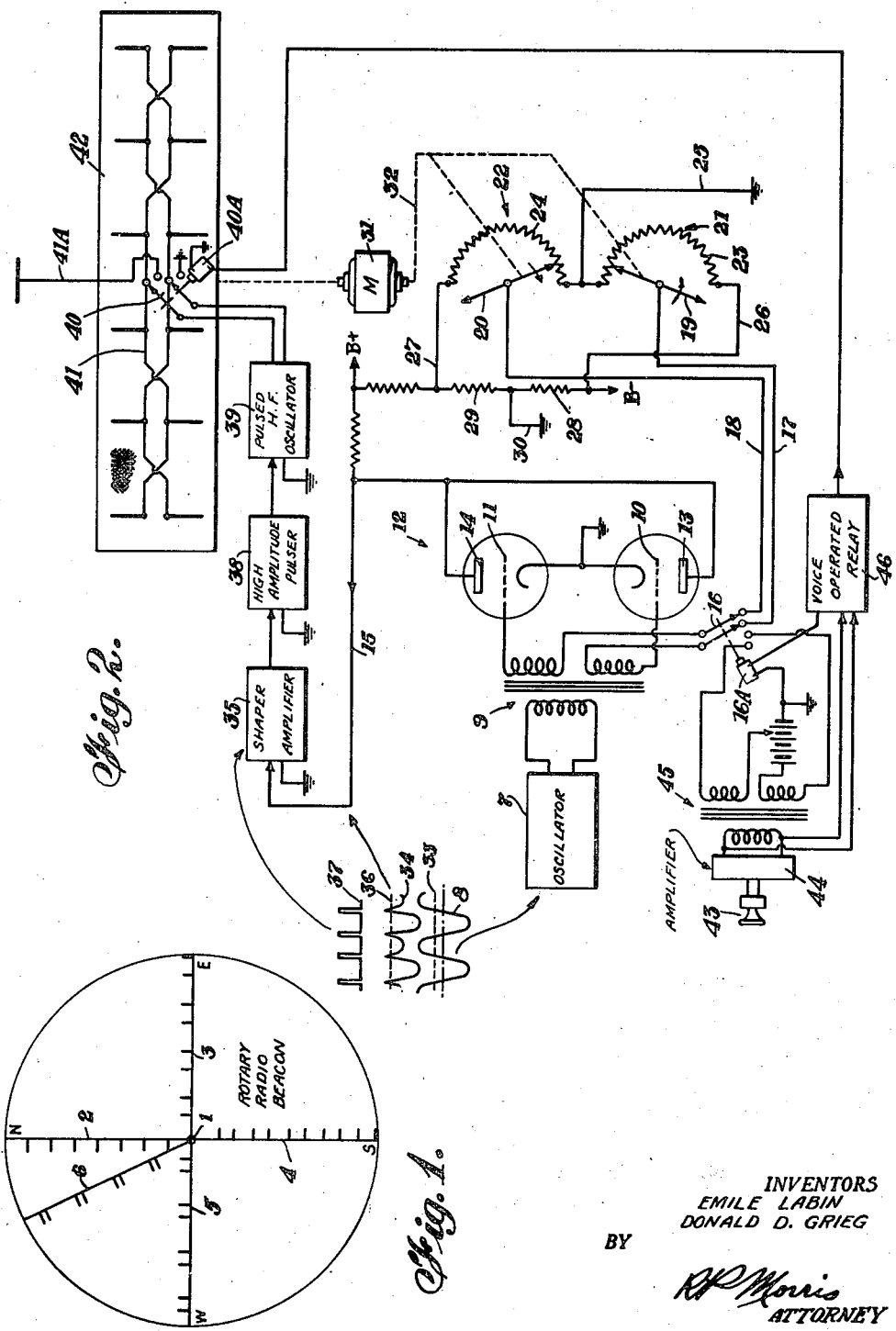
INVENTORS
EMILE LABIN
DONALD D. GRIEG
BY
R P Morris
ATTORNEY

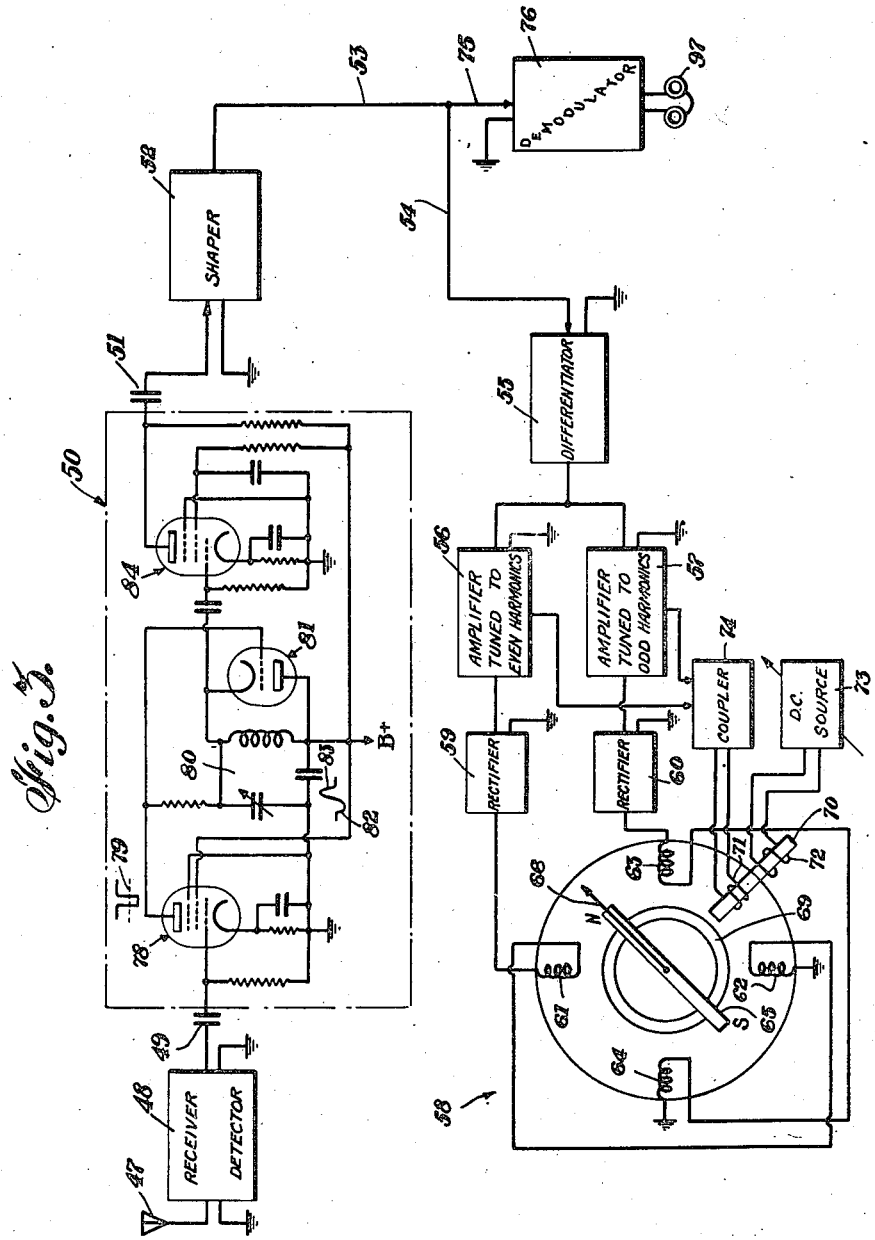

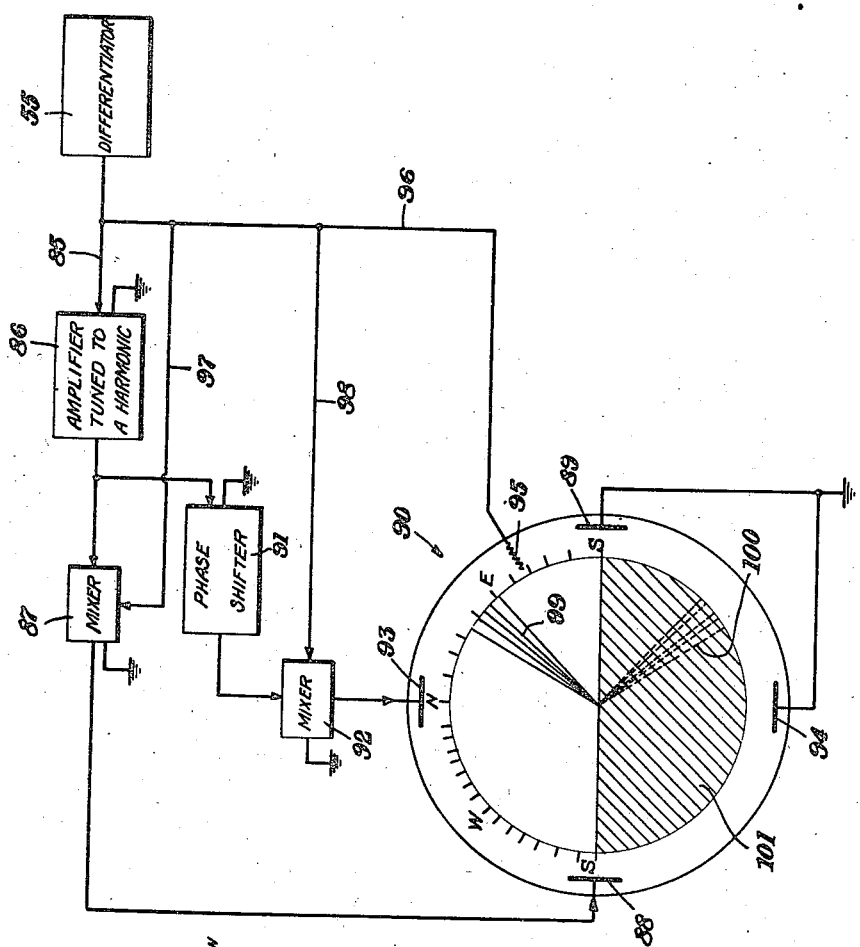

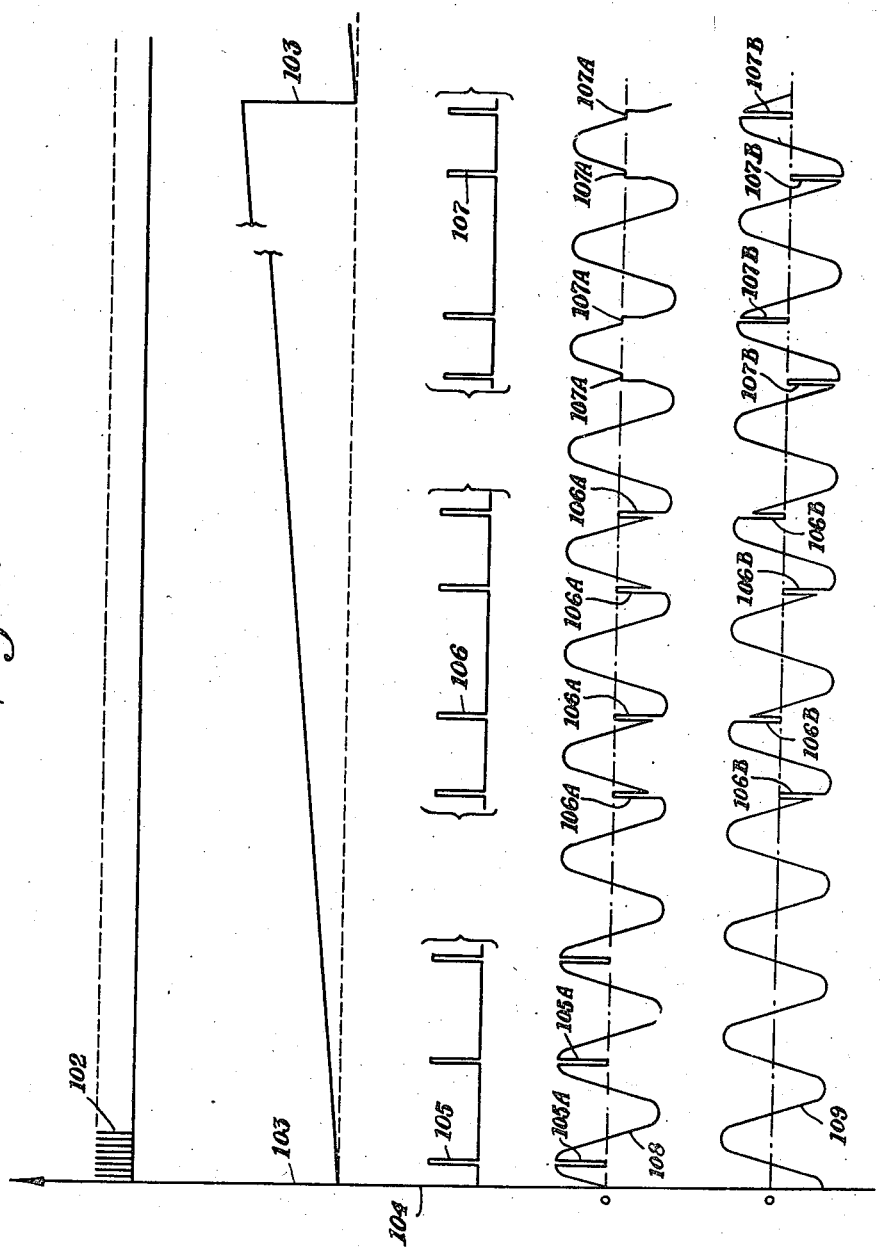

Patented Sept. 28, 1948

2,450,005

UNITED STATES PATENT OFFICE 2,450,005

OMNIDIRECTIONAL RADIO BEACON

Emile Labin, New York, and Donald D. Grieg, Forest Hills, N. Y., assignors to Federal Telephone and Radio Corporation, New York, N. Y., a corporation of Delaware Application April 26, 1944, Serial No. 532,724

25 Claims. (Cl. 343—106)

1

This invention relates to radio beacons and more particularly to rotary radio beacons and beacon systems of the type generally called omnidirectional beacons.

Numerous systems have been proposed for providing beacon signals transmitted from the ground which will serve to guide an aircraft on a substantially straight line to a fixed location, regardless of the direction of approach. These previously proposed beacons generally provide signal indications which will give the pilot of a craft to be guided a given signal when he is in a predetermined direction from the station and different signals at different locations about the station. For this purpose, different tone modulations with different directions of transmission have been proposed heretofore, in combination with a filter system for each craft, each such system comprising a plurality of different filters arranged to segregate the different signals so that the craft pilot will know with which course he is aligned.

It is an object of our invention to provide a rotary radio beacon using pulse signals in which the spacing between the pulses is altered for different directions of transmission.

It is a further object of our invention to provide a radio beacon system and method wherein the different directions of a rotary beacon are indicated by variations in spacing between pairs of transmitted pulses.

It is a still further object of our invention to provide a rotary beacon system together with novel indicator means for indicating the directional signals produced in the rotary radio beacon.

It is a still further object of our invention to provide a radio receiver system for receiving pulses of different spacings and for indicating the relative spacing of the received pulses in response to the spacing of the received pulses.

In accordance with a feature of our invention, we provide at a given location to which it is desired to guide aircraft from a multiplicity of directions, a directive radio transmitter, the directive pattern of which may be rotated about the center of said position. In each direction of transmission, the beacon transmitter transmits trains of pulses, the spacing between the pulses of each train being varied in accordance with the direction of transmission of the system. On the craft using this beacon is provided a simple receiving circuit which will receive the pulses transmitted therefrom and produce an indication in accordance with the spacing of the received pulses. By maintaining this indication fixed, the pilot may

2 guide the craft along a line at a predetermined direction from the given location.

A better understanding of our invention and the objects and features thereof may be had from the particular description thereof made with reference to the accompanying drawing, in which:

Fig. 1 is a diagrammatic illustration of a rotary beacon system in accordance with our invention, showing the types of signals transmitted in various directions;

Fig. 2 is a circuit diagram of a rotary radio beacon transmitter system in accordance with our invention;

Fig. 3 is a receiver equipment suitable for use with the rotary radio beacon illustrated in Fig. 2;

Fig. 4 is a diagrammatic illustration used in explaining the operation of the indicator of Fig. 3;

Fig. 5 is a modified form of indicator that may be used in place of the beacon indicator shown in Fig. 3; and Fig. 6 is a graphical representation used in explaining the operation of the system of the indicator of Fig. 5.

Turning first to Fig. 1, I represents a rotary radio beacon which may be located at any desired position along an air route or at an airport to which craft are to be guided. In one direction, for example, in the north direction, rotary radio beacon I transmits a series of equally spaced pulses 2. The beacon may be rotated in a clockwise direction, for example. The spacing between the transmitted pulses varies as the beacon is rotated so that, when the beacon has reached the east direction, the train of pulses has changed in position, as represented at 3. As the beacon continues to rotate, the spacing of the pulses is altered, as successively indicated at 4, 5 and 6. When the beacon again reaches the north direction, the pulses are again spaced back to the original spacing, as shown by train of pulses 2 and the cycle is repeated. It will, therefore, be readily seen that with a system of this nature the pulses received on any craft will serve to indicate a desired course upon which the craft is located and simultaneously the azimuth direction of this course from the radio beacon I.

A suitable form of transmitter for this rotary beacon may take the form shown by way of example in Fig. 2. In this figure there is provided an oscillator 7 operating at a predetermined frequency. This oscillator may, for example, be a sine wave oscillator producing a wave such as shown at 8. This wave is fed over transformer 9 to grids 10 and 11 of a grid controlled rectifier unit 12. Anodes 13 and 14 are coupled in parallel to an output line 15. Grids 10 and 11 are coupled over a switch 16 and lines 17 and 18 to rotary brushes 19 and 20 of rotary distributors 21, 22. Rotary brushes 19 and 20 each slide over resistance elements 23, 24, respectively, one end of which is connected to ground through the lead 25. The other ends of resistances 23, 24 are connected over lines 26, 27 and fixed resistors 28, 29 to another ground connection 30. The B supply for the anodes of grid control rectifier 12 is connected between the points shown at B— and B+ in the drawing so that negative and positive potential drops from the anode source are applied across resistors 23 and 24.

The same source of potential is used for the anodes of rectifier 12 and the resistor units 23 and 24 which control the grid bias of the rectifier tubes so that variations in anode supply voltage which would otherwise affect the timing of the cusps of the rectified output waves will be compensated by a corresponding change in resistance drop in resistors 23, 24 and a consequent change in grid bias.

Brushes 19 and 20 are shown as rotating in opposite directions under control of a motor 31 and the connecting drive means 32. Accordingly, when brushes 19 and 20 are in the vertical position, grids 10 and 11 are connected over lines 17 and 18 directly to ground 25. Under these conditions, the rectifier operates without bias. However, as brushes 19 and 20 are rotated by motor 31, bias voltages of opposite polarity are applied to grids 10 and 11, giving the rectifier 12 a substantially unsymmetrical bias, as indicated by line 33, associated with curve 8. Accordingly, the output wave in line 15 under these conditions will take on substantially the form shown in curve 34. This rectified wave is applied to pulse shaper and amplifier 35 which serves to clip wave 34 at level 36 and re-shape these pulses into rectangular form, as shown by curve 37.

It will be appreciated that in the zero position the pulses of curve 37 will be substantially equally spaced, but as brushes 19 and 20 rotate, the spacing between the pulses of curve 37 will vary so that the pulses of each of the pairs are brought closer toward one another because of the variation in the grid bias level at 33. This variation in spacing will continue with the rotation of brush arms 19, 20, until the far ends of resistors 23, 24 are reached, at which time the oppositely extending portions of arms 19, 20 will come into contact with the near ends of these resistors. Thereafter, the bias will again be reduced to zero and the cycle will be again repeated.

The output pulses from shaper amplifier 35 are preferably applied to high amplitude pulser 38, producing high amplitude pulses. The high amplitude pulses from pulser 38 are preferably applied to key a pulsed high frequency oscillator to produce high amplitude pulses of radio frequency carrier spaced apart a distance determined by pulses of train 37. These high amplitude pulses are applied over switch contacts 40 to a directive antenna array 41, preferably provided with a reflecting screen 42 which serves to make the radiation from array 41 unidirectional. Antenna array 41 may be of any suitable form producing relatively sharp beams of energy. Antenna 41, together with reflector 42, is rotated by motor 31 in synchronism with the rotary brushes 19 and 20. It will thus be seen that, as antenna 41 is rotated, a variation in the spacing of the transmitted pulses will occur, this variation in spacing being synchronized with the rotary positioning of the rotary antenna. Thus, in every different direction of transmission, a different spacing of the pulses transmitted will occur.

Should it be desired to communicate over this rotary beacon, switch 16 may be operated to the left connecting grids 10 and 11 to a biasing battery which serves to normally bias the rectifier 12 into unsymmetrical biased relationship. Voice frequency signals may be applied over a microphone 43, amplifier 44 and transformer 45 to alter bias of grids 10 and 11 and thereby the spacing of the transmitted pulses in accordance with applied voice frequency energy.

Preferably, also switch contacts 40 are disconnected from directive antenna 41 and applied to omnidirectional antenna 41A so that the voice signals will be broadcast to the craft. Switch contacts 16 and 40 may be automatically operated in response to voice signals. To this end the output of amplifier 44 may be applied to a voice operated relay 46 which serves to energize switch magnets 16A and 40A. These switch magnets then serve to couple in the voice transmitting circuits when voice or other audio signals are applied at microphone 43, and to simultaneously disconnect directive antenna 41 and the rotary bias resistors 23 and 24. Thus, when it is desired to transmit voice signals to craft within the field of the beacon, the voice time modulation circuit may be automatically substituted for the normal beacon signaling circuit.

Turning now to Fig. 3, a receiver circuit suitable for receiving and discriminating between pulses of different spacing is illustrated. In this arrangement the radiated pulse signals are received from antenna 47 and are applied to a receiver and detector 48 which serves to detect the incoming signals to video frequency, reproducing the pulsing envelopes. These detected pulses are applied over a coupling condenser 49 to pulse width discriminator 50. Pulse width discriminator 50 serves to select pulses of the desired width to the exclusion of other received pulses, thus cutting down the likelihood of interference in the receiver circuit. In addition, the accepted pulses are reduced to a common width characteristic. The selected pulses are then applied over a second coupling condenser 51 to a limiter and shaper 52. These limited and shaped pulses are then applied over line 53 and branch line 54 to a differentiator 55. Differentiator 55 serves to sharpen the received and shaped pulses and thus further eliminates the effects of width variation. These pulses are then applied to filters 56 and 57 tuned to an even and an odd harmonic, respectively, of the cadence frequency of the normal pulse train. A Fourier Analysis of pulses modulated in spacing, in accordance with the symmetrical displacement, as indicated in the transmitter of Fig. 2, shows that the amplitudes of even harmonics of the fundamental repetition rate of the pulse pairs follows a cosine variation with the time modulation displacement while the odd harmonics follow a sine variation with respect to symmetrical conditions.

Thus, for a time modulation displacement which causes a given odd harmonic to vary from zero to a maximum finite value, the amplitude of the adjacent even harmonic will vary from a given finite value to zero. This ratio of amplitudes is made to read directly on an indicator, as shown at 58. The even and odd harmonics selected at 56, 57 are applied over rectifiers 59, 60 to pairs of coils 61, 62 and 63, 64, respectively.

Rectifiers 59 and 60 are preferably biased so that their outputs may swing from zero to both positive and negative potential values so that with the coils 61 to 64 magnetic fields varying in position around the circle can be produced. In indicator 58 in the resultant field produced by coils 61 to 64 is mounted a bar magnet 65 having a north and south pole. As a consequence, this magnet will take a resultant position dependent upon the relative amplitude of the odd and the even harmonics passed over amplifiers 56, 57. A pointer 66 is provided to indicate the direction of the craft from the radio beacon station. It is, therefore, necessary only for the pilot to maintain pointer 66 in a given position to follow a given beacon course into the beacon. The two resultant fields applied to coils 61, 62 and 63, 64, respectively, will be, in effect, 90° apart, as represented by curves 67 and 68 of Fig. 4. It will be recognized that the zero line of curves 67 and 68 represents zero level. The normal rectifier level may be represented by the positive swing of these curves, for example, and the negative swing is provided by reason of the bias provided by the rectifier and discussed above.

Since the rotating beacon rotates at a relatively slow angular speed, for example, one revolution every ten seconds, meter 58 will be energized at relatively long intervals. Accordingly, there is a danger that the pointer indication may be displaced during these intervals between reception of the pulse signals. To avoid this arrangement, a locking mechanism may be provided to hold pointer 66 in the last indicating position. This may be accomplished by providing a magnet ring 69 mounted below magnet 65 or, if desired, above and below the magnet. This ring 69 is preferably made of easily magnetized material which will not retain its magnetism once the magnetizing force is removed. Operatively associated with ring 69 is an electromagnet 70.

On magnet 70 are provided coils 71 and 72. Current from a D. C. source 73 is applied to coil 72 producing in magnet 70 a predetermined magnetizing force which, in turn, will magnetize ring 69 and rock the bar magnet 65 down against a friction surface associated with the ring to hold it from rotation. When signal is applied to amplifiers 56 and 57, however, a D. C. component of this amplified signal is applied over coupler 74 to winding 71 of magnet 70. This coil 71 is wound in opposite direction to coil 72 so that the current flowing therein tends to neutralize the magnetizing force from coil 72. The D. C. source 73 is adjusted so that it will be just counter-balanced by the current applied through D. C. coupler 74.

Accordingly, when signals are received, magnet 70 is effectively de-energized releasing permanent magnet 65 for rotation to the new balancing position. Upon cessation of signals, however, no current is applied to winding 71 and, as a consequence, magnet 70 is again energized by the action of coil 72 to lock the pointer in position. This particular type of indicator is shown only by way of illustration. For a more particular description of this indicating arrangement and its structural details, reference may be had to the copending application of D. D. Grieg, Serial No. 531,882, filed April 20, 1944, patented August 26, 1947, Patent No. 2,426,203.

When voice signals are being transmitted, energy from line 53 is applied over branch line 75 to pulse time demodulator 76 and from there to earphones 77 so that the voice signals may be received and reproduced.

Pulse width selector 50 is provided so that only pulses of the desired width will be selected for controlling the indicator shown in Fig. 3. By selecting pulses of a particular width to the exclusion of other pulses, it is possible to prevent interference with the receiving system by other stations. The pulse width selector may be of any known type but is herein illustrated as a simple form described in detail in our copending application, Serial No. 487,072, filed May 15, 1943, patented April 27, 1948, Patent No. 2,440,278.

According to this invention, the received pulses are reproduced in the output of inverter tube 78 to provide negative pulses, as shown at 79. These negative pulses are applied to shock excite tuned circuit 80 which is tuned to a frequency of which the pulse width represents one-half a wavelength. The pulses are simultaneously applied to the grid of damping tube 81 connected across tuned circuit 80. The pulses applied to tank circuit 80 will produce a wave having a negative portion, as shown at 82, and a positive portion at 83. The oscillations produced in tank circuit 80 will tend to go negative after portion 83 has been produced. However, damping tube 81 will short circuit any further negative portion, since, at this time, the negative pulse 79 no longer is present on the grid of tube 81. As a consequence, only the portions 82 and 83 are produced.

If pulses of different widths, either smaller or larger, are applied to the input circuit, these pulses will produce portions 83 having lower peak amplitudes since they are not related to the one-half wavelength period as are those of the wanted pulses. Accordingly, the wanted pulses will produce the higher peak values. These higher peak portions 83 from the output of circuit 80 are then threshold clipped by clipper amplifier tube 84. This tube is biased to such a value that the portions 83 of lower amplitude will not pass. The peak portions passed correspond only to the received pulses of the desired width. These peak pulses, so selected, are then applied over condenser 51 to the limiter-shaper 52 and the remaining portions of the circuit in the manner previously described.

While a difference in width is shown as the preferred method of selecting the wanted pulses, it is clear that other pulse characteristics may be used to distinguish between wanted and unwanted pulses in a manner known in the prior art. If such other characteristics are chosen, then pulse width selector 50 will be replaced by another pulse selector which will serve to select the pulses in accordance with the desired characteristics.

An alternative form of indicator arrangement using a cathode ray indicator in place of the electromagnetic indicator of Fig. 3 is shown in Fig. 5. In this figure only so much of the circuit as differs from that shown in Fig. 3 is illustrated. From the output of a differentiator 55, the received pulses are applied over a line 85 to a tuned amplifier 86, preferably tuned to a selected harmonic of the pulse repetition rate. This may, for example, be the fifth harmonic of the time modulated pulses corresponding to a 60 kilocycle frequency if a 12 kilocycle repetition rate is chosen for the pulse frequency. The harmonic wave output of amplifier 86 is applied over a mixer circuit 87 to the horizontal deflection plates 88, 89 of cathode ray oscilloscope 90. The same harmonic wave output from amplifier 86 is also applied over a phase shifter 91 which serves to produce a 90° phase shift and a mixer circuit 92 to the vertical deflection plates 93, 94 of oscilloscope 90. As a consequence, the cathode beam of oscilloscope 90 will tend to rotate about the face of the screen at a rate determined by the chosen harmonic.

A control grid 95 is provided in oscilloscope 90 which is normally biased to suppress the beam. However, grid 95 is coupled over line 96 to the output of differentiator 55 so that each time a pulse appears in the output of differentiator 55, a spot will be caused to appear on the screen of the cathode ray tube corresponding to this received impulse. This spot appears on the screen at a point corresponding to the relative timing of the received pulses and thus corresponds to the angular position of the receiving circuit with respect to the transmitting beacon.

It may be desired, however, to have a line appear on the screen instead of a spot since this may be easier to read than would be a simple spot. To this end the output pulses from line 96 are simultaneously applied over lines 97 and 98 to mixers 87 and 92, respectively, to produce a corresponding alteration in the rotary control wave, simultaneously with the positive pulsing applied to grid 95. Thus, the indication appears on the screen in the form of a series of line tracings 99 corresponding in direction to the desired course. Since there are two pulses in each pair which are symmetrically displaced, one with respect to the other, there would normally be on the screen a second set of line tracings shown at 100. However, this would give a double indication on the screen of the tube which would not be desirable. The two indications 99 and 100 tend normally to rotate in opposite directions one to another. Accordingly, for normal readings a masking screen 101 is provided to mask half of the face of the oscillograph screen.

However, this double beam indication may be used to provide a simple means for calibrating the oscilloscope. All that is necessary to insure the proper calibration is to adjust the phase of the initial base wave used to rotate the beam so that the two sets of indicator lines 99, 100 produce equal angles on opposite sides of the reference line s—s and coalesce into a single line at the reference line when the beacon beam is in the reference direction. Under these conditions, if the transmitted homing bearings are correct, due to the timing relationship of the time modulated pulses and the base wave, the received indications will likewise be correct.

A better understanding of the addition of the pulses and timing waves to produce the line indications may be had by reference to Fig. 6. In this figure the plurality of time pulses being transmitted may be represented by curve 102. The cyclic modulation variation during the period of rotation may be represented by the saw-tooth wave from 103. To a larger scale in curve 104 are shown three series of pulses 105, 106 and 107 representing three different bearing positions corresponding to different positions beyond the beacon. Bearing No. 1, represented by pulses 105, may represent the true north in which the pulses are all symmetrically and evenly spaced. Bearing No. 2, shown by pulses 106, shows a position wherein the pulses are displaced toward one another while bearing No. 3, represented at 107, shows the pulses at a still closer spacing. Timing waves 108 and 109 may represent the tuned waves from the output of mixers 87 and 92, respectively, of Fig. 5. These waves are displaced 90° in phase with respect to one another in accordance with the positioning of phase shifter 91. In the mixing circuit pulses 105 are added to waves 108 and 109, respectively, to produce the inward deflection of the cathode ray beam at the instant the pulses are applied to grid 95. These pulses in the mixing circuit serve to reduce waves 108 and 109 momentarily to zero.

At bearing No. 1 the pulses 105 added to 108 produce the depression 105A in the wave 108, but since wave 109 is already at zero, they have no effect on this wave. In the bearing No. 2 position pulses 106 add to both sets of waves 108 and 109, serving to reduce both waves 108 and 109 momentarily to zero, as shown at 106A and 106B, respectively, and similarly in bearing No. 3 pulses 107 add to both sets of curves 108 and 109, serving to reduce these indications to zero, as indicated by pulses 107A, 107B, respectively. In this way a line is produced on the screen each time a pulse is applied to grid 95. Since the beam width produced in the rotating antenna is of finite dimensions, there will be a number of pulses received over the receiving antenna while the beam is in motion. As a consequence, there will be a series of lines, as shown at 99, instead of a single line to produce the pointing indication. It is, therefore, necessary to use the center of the sector outlined by lines 99 as the correct directional indication.

While we have shown and described a specific modification of our invention and variations thereof in the illustrations, it will be clear that any modifications and variations within the scope thereof will be readily ascertained by those skilled in the art to which it pertains. Accordingly, this illustration of the specific embodiment is not to be considered as a limitation on our invention, as set forth in the objects thereof and in the accompanying claims.

What is claimed is:

1. An angularly shiftable radio beacon system, comprising radiator means for providing a shiftable directional radiation pattern, means for applying trains of pulses of radio frequency energy to said radiator to provide radiated signals for said radiation pattern, and means operative synchronously with the directive shifting of said directional radiation pattern for controlling the spacing of the pulses of said trains in accordance with the angular position of said pattern.

2. A beacon system according to claim 1, further comprising receiver means for receiving the radiated signals of said radiation pattern, and indicator means responsive to the spacing of the pulses of said received signals for indicating the position of said receiver means relative to said radiator.

3. A rotary radio beacon system, comprising a radiating means for producing a directive radiation pattern, means for controlling said radiating means to produce a rotation of said pattern at a predetermined rate, pulse means for applying pairs of radio frequency pulses to said radiating means to provide radiated signals, and control means operative synchronously with rotation of said radiation pattern for providing a different spacing of the pulses of said pairs for different rotary positions of said radiation pattern.

4. A radio guiding system for indicating the angular position of a craft relative to a given location, comprising means at said given location for radiating time spaced pairs of pulses, means for giving to the pulses of said pairs different spacings for different directions about said given location, receiver means on said craft for receiving said spaced pairs of pulses, and indicator means coupled to said receiver means for providing an indication of said angular position in response to the spacing of said pulses of the received pairs of pulses.

5. A radio guiding method for indicating the angular position of a craft relative to a given location, comprising radiating time spaced pairs of pulses from said given location, giving to the pulses of said pairs different spacings for different directions about said given location, receiving said spaced pairs of pulses on said craft, and producing an indication of said angular position in response to the spacing of said pulses of the received pairs of pulses.

6. A beacon system according to claim 3, further comprising a source of voice signal energy, and means responsive to said voice signal energy for disconnecting said pulse means from said control means and coupling said source of voice signal energy to said pulse means, whereby pulses displaced to represent said voice signals are transmitted.

7. A radio pulse producing system comprising a full wave rectifying means having a pair of grids and a pair of anodes, means for applying sine wave oscillations to said grids to provide a full wave rectified output, clipping and shaping means to produce pulses from said output, anode connections to supply anode potential to said anodes, grid bias connections for said grids including variable grid bias control means to vary the bias of said grids simultaneously in opposite directions to produce variation in the spacing of said output pulses, and common potential means for said anode connections, and grid bias connections to provide anode voltage and grid bias for said rectifier, whereby variations in the potential will not produce a variation in the spacing of said produced pulses.

8. A radio beacon system comprising means for directively transmitting pairs of pulses, means for altering the direction of transmission of said pairs of pulses, means operated synchronously with alteration of said direction for displacing the pulses of each of said pairs of pulses toward and away from one another to provide a different spacing of said pulses, means for receiving said pulses, means for producing control waves from said pulses having a characteristic dependent upon the spacing of said received pairs of pulses and indicator means responsive to said control waves for producing a directional indication dependent upon said received pulse spacing.

9. A system according to claim 8, wherein said means for producing control waves comprises a tuned amplifier circuit.

10. A system according to claim 8, wherein said means for producing said control waves comprises a tuned amplifier circuit and means for producing two phase quadrature related waves from the output of said amplifier, and said indicator means comprises a cathode ray oscilloscope having a cathode ray beam, means for producing a rotation of said beam in accordance with said phase quadrature waves, and means for changing the brilliance of said beam in accordance with said received pulses.

11. A system according to claim 8, wherein said means for producing said control waves comprises a pair of amplifier circuits tuned respectively to odd and even harmonics of the repetition rate of said received pairs of pulses, whereby the amplitude of said harmonics will vary in accordance with the variation in spacing of said received pulses, and said indicator comprises means for indicating the relative amplitudes of said harmonics, whereby the direction of said beacon with said receiver may be indicated.

12. A system according to claim 8, wherein said means for producing said control waves comprises a pair of amplifier circuits tuned respectively to odd and even harmonics of the repetition rate of said received pairs of pulses, whereby the amplitude of said harmonics will vary in accordance with the variation in spacing of said received pulses, and said indicator comprises means for indicating the relative amplitudes of said harmonics, whereby the direction of said beacon with said receiver may be indicated, and means for locking said indicator in the last indicating position in response to cessation of receipt of further pulses.

13. A system according to claim 8, wherein said transmitted pulses are given a predetermined pulse characteristic and said means for receiving said pulses comprising means for passing only pulses of said predetermined characteristics.

14. A receiver for receiving pulse trains having the pulses therof spaced apart in pairs, the pulses of said pairs having different spacings for producing indications dependent upon said spacings, comprising means for producing control waves in response to said received pulses having a characteristic dependent upon the spacing of said received pulses, an indicator, and means for producing an indication on said indicator responsive to said control waves.

15. A system according to claim 14, wherein said means for producing control waves comprises a tuned amplifier circuit.

16. A system according to claim 14, wherein the pulses of desired pulse trains have a predetermined pulse characteristic and said means for receiving said pulses comprising means for passing only pulses of said predetermined characteristics.

17. A receiver for receiving pulse trains having the pulses thereof spaced apart in pairs, the pulses of said pairs having different spacings for producing indications dependent upon said spacings, comprising means for selecting waves having odd and even harmonics of the pulse repetition rate of said received pulses, whereby the amplitude of said harmonics will vary in response to variation in the spacing of said received pulse pairs, and means responsive to the relative amplitudes of said harmonics for producing indications of said pulse spacings.

18. A receiver for receiving pulse trains having the pulses thereof spaced apart in pairs, the pulses of said pairs having different spacings for producing indications dependent upon said spacings, comprising means for selecting a harmonic frequency wave of the repetition frequency of said received pairs of pulses, means for phase shifting a portion of the selected harmonic wave to provide two waves of the said harmonic frequency in phase quadrature relationship, a cathode ray indicator, means for applying said phase quadrature waves to said cathode ray indicator to produce rotation of the cathode ray beam, a control grid for said cathode ray indicator, and means for applying said received pulses to said grid to produce indications positioned angularly on the screen of said indicator in accordance with the spacing of said received pulses.

19. A receiver according to claim 16, further comprising means for adding said received pulses to said phase quadrature waves before application to said indicator, whereby radial linear indications are produced on said screen upon application of said pulses to said grid.

20. An angularly shiftable radio beacon system comprising a radiator means for providing a shiftable directional radiation pattern, means for modulating the energy of said pattern to provide components of different frequencies in said pattern, and means operative synchronously with the directive shifting of said radiation pattern for controlling the amplitude ratios of said different components in accordance with the angular position of said pattern.

21. A beacon system according to claim 20, further comprising receiver means for receiving the radiation energy of said pattern, and indicator means responsive to the amplitude ratio of the different components to indicate the angular position of said pattern.

22. A rotary radio beacon system comprising a radiating means for producing a rotary directive radiation pattern, means for modulating the energy of said pattern to provide given signal components of different frequencies in said pattern, and means operative synchronously with the rotation of said pattern for controlling the amplitudes of said given components in accordance with sine and cosine functions respectively in accordance with the rotary position of said pattern.

23. A receiver adapted to provide an indication of direction with respect to a radio beam having signal components varying in amplitude ratio as the beam rotates through a given angle, comprising means for receiving the beam, means for separating said components from the received beam, and means for comparing the ratios of the separated component signals.

24. A receiver adapted to provide an indication of direction with respect to a radio beam having signal components of different frequencies varying in amplitude in accordance with sine and cosine functions as the beam rotates through a given angle, comprising means for receiving said beam, means for separating said components from the received beam, and means for comparing the amplitudes of said separated components to determine the amplitude ratios.

25. A system according to claim 7, further comprising a rotatable directive radiation system, means for modulating energy of said system with said produced pulses, and means for controlling the adjustment of said variable grid bias control means in accordance with the angular position of said directive radiation system.

EMILE LABIN.
DONALD D. GRIEG.

REFERENCES CITED

The following references are of record in the file of this patent:

UNITED STATES PATENTS

| Number | Name | Date |
|---|---|---|
| 833,034 | De Forest | Oct. 9, 1906 |
| 2,112,283 | Fritz | Mar. 29, 1938 |
| 2,192,975 | Kotowski et al. | Mar. 12, 1940 |
| 2,309,525 | Mohr | Jan. 26, 1943 |